(12) United States Patent
Sawado

(10) Patent No.: US 7,907,240 B2
(45) Date of Patent: Mar. 15, 2011

(54) TRANSFLECTIVE LIQUID CRYSTAL DEVICE AND ELECTRONIC APPARATUS HAVING A LIQUID CRYSTAL LAYER OF VARYING THICKNESS

(75) Inventor: Ayae Sawado, Kai (JP)

(73) Assignee: Seiko Epson Corporation, Tokyo (JP)

( * ) Notice: Subject to any disclaimer, the term of this patent is extended or adjusted under 35 U.S.C. 154(b) by 259 days.

(21) Appl. No.: 11/972,965

(22) Filed: Jan. 11, 2008

(65) Prior Publication Data

US 2008/0204638 A1 Aug. 28, 2008

(30) Foreign Application Priority Data

Feb. 28, 2007 (JP) ................................ 2007-048915

(51) Int. Cl.
*G02F 1/1335* (2006.01)
*G02F 1/133* (2006.01)

(52) U.S. Cl. .......................................... 349/114; 349/33

(58) Field of Classification Search .................... 349/114
See application file for complete search history.

(56) References Cited

U.S. PATENT DOCUMENTS

| | | | | |
|---|---|---|---|---|
| 2002/0149551 A1* | 10/2002 | Yamakita et al. | ............... | 345/87 |
| 2006/0007363 A1* | 1/2006 | Ozawa et al. | ..................... | 349/1 |
| 2006/0050210 A1* | 3/2006 | Tsuchiya | ..................... | 349/114 |
| 2007/0216840 A1* | 9/2007 | Liao et al. | ..................... | 349/141 |
| 2008/0100784 A1* | 5/2008 | Haruyama | ..................... | 349/114 |

FOREIGN PATENT DOCUMENTS

| | | |
|---|---|---|
| JP | A-2001-296519 | 10/2001 |
| JP | A-2002-328399 | 11/2002 |

* cited by examiner

*Primary Examiner* — Mark A Robinson
*Assistant Examiner* — Michael Inadomi
(74) *Attorney, Agent, or Firm* — Oliff & Berridge, PLC

(57) ABSTRACT

A liquid crystal device includes two substrates sandwiching a liquid crystal layer and has a reflective display area and a transmissive display area. A liquid crystal layer thickness adjusting layer makes a thickness of the liquid crystal layer in the reflective display area smaller than in the transmissive display area. The device performs display by transitioning an alignment of the liquid crystal layer from splay alignment to bend alignment. The liquid crystal layer thickness adjusting layer has a slope inclining from the reflective display area side to the transmissive display side. A pixel electrode electrically connected to a switching element, which is electrically connected to a signal line, are provided on one of the substrates. A slit is formed in the pixel electrode at an area overlapping with the slope in plan view and part of the signal line is projected along at least part of the slit.

9 Claims, 6 Drawing Sheets

(BEND ALIGNMENT)

(SPLAY ALIGNMENT)

TRANSFLECTIVE LIQUID CRYSTAL DEVICE AND ELECTRONIC APPARATUS HAVING A LIQUID CRYSTAL LAYER OF VARYING THICKNESS

BACKGROUND

1. Technical Field

The present invention relates to a liquid crystal device and an electronic apparatus.

2. Related Art

In recent years, in the field of liquid crystal device represented in particular by a liquid crystal television or the like, a liquid crystal device of an OCB (Optical Compensated Bend) mode which has high response speed has been spotlighted in order to improve moving image quality. In the OCB mode, it is required that liquid crystal is in splay alignment opened in a splay manner between two substrates in the initial state and is bent in an arched manner (bend alignment) during display operation. That is, high speed response is provided by modulating transmittance ratio by the bent degree of the bend alignment during display operation.

In the case of such a liquid crystal device of an OCB mode, liquid crystal is in splay alignment when power source is off. Accordingly, so called initial transition operation to cause transition from the initial splay alignment state to the bend alignment state by applying a voltage larger than a threshold voltage to the liquid crystal is required when power source is turned on, because the bend alignment state is required during display operation. A technique for advancing initial alignment transition of liquid crystal by using horizontal electric field generated between with a pixel electrode is disclosed in JP-A-2001-296519 (hereinafter, referred to as Patent Document 1).

Incidentally, a transflective type liquid crystal device is used for a display unit of a mobile electronic apparatus (electronic apparatus), for example, such as a mobile phone, a personal digital assistance, and the like, and the above described OCB mode is employed also in such a liquid crystal device.

However, in the technique described in Patent Document 1, a high voltage for creating a transition nucleus at a predetermined position of the pixel electrode is required. Since sufficient electric field intensity can not be obtained by a power source having a small capacity used for the above electronic apparatus, the transition nucleus can not be fully and uniformly generated. Accordingly, there are problems in that display defect occurs and a desired high speed response can not be obtained.

SUMMARY

An advantage of some aspects of the invention is that it provides a liquid crystal device and an electronic apparatus which make it possible to perform initial alignment transition in an OCB mode liquid crystal device by a low voltage and with rapidity.

According to an aspect of the invention, there is provided a liquid crystal device comprising: a pair of substrates; and a liquid crystal layer interposed between the substrates, wherein the liquid crystal device has a plurality of sub-pixel areas, each of the sub-pixel areas having a reflective display area and a transmissive display area, the liquid crystal device being configured to perform display operation after changing an alignment state of liquid crystal molecules in the liquid crystal layer from a splay alignment state into a bend alignment state; and a liquid crystal layer thickness adjusting layer that makes the thickness of the liquid crystal layer in the reflective display area thinner than the thickness of the liquid crystal layer in the transmissive display area. The liquid crystal layer thickness adjusting layer is equipped with a slope between the reflective display area and the transmissive display area. A signal line, a switching element electrically connected to the signal line, and a pixel electrode electrically connected to the switching element are provided on one of the substrate among the pair of the substrates. A slit is formed in the pixel electrode at an area overlapping with the slope in plan view. A part of the signal line is projected along at least a part of the shape of the slit.

According to the liquid crystal device, by applying a voltage to the signal line, an electric field generated between the signal line and the pixel electrode near the area at which the slit of the pixel electrode is formed can be used for initial transition operation. Further, disclination can be easily generated in the liquid crystal layer by the electric field as the slit is provided at the slope of the liquid crystal layer adjusting layer at which alignment is easily disturbed due to the inclining alignment of the liquid crystal molecules. Accordingly, the initial transition can be easily propagated from the disclination, i.e. a transition nucleus, so that the initial alignment transmission in an OCB mode liquid crystal device can be performed at a low voltage and with rapidity.

Further, it is preferable that the slit includes a bending section in the liquid crystal device.

Herewith, electric field can be generated in various directions between the pixel electrode having a bending section and the signal line, generation of a transition nucleus can be further surely generated by the bending section, and uniformity and high speed property of the initial transition can be further enhanced.

Further, it is preferable that an edge of the pixel electrode is overlapped with the signal line in the liquid crystal device.

Herewith, the liquid crystal molecules above the edge of the pixel electrode can be also aligned, and initial transition can be generated in a wide range on the pixel electrode.

Further, it is preferable that the signal line is a source line electrically connected to the switching element in the liquid crystal device.

Herewith, an electric field can be generated between the source line and the pixel electrode, for example, by inputting an image signal to only the source line during initial transition operation. Herewith, initial alignment transition can be generated.

Further, it is also preferable that the signal line is a scanning line electrically connected to the switching element in the liquid crystal device.

Herewith, a voltage applied to the scanning line (gate line) is higher than a voltage applied to the other signal line not only during the initial alignment transition operation but also during display operation, so the electric field described above is increased in proportional to the voltage. Consequently, disclination can be more surely generated.

In this case, it is preferable that the slit is formed at the edge of the pixel electrode opposite to the side at which the switching element is provided.

Herewith, although an electric field is hard to generate just above the switching element, the switching element is covered by the pixel electrode by forming the slit from the edge side opposite to the side at which the switching element is provided. Consequently, the area in which the slit is formed can be effectively used as an electric field generating portion for providing the initial alignment transition.

Further, it is preferable that a light shielding film overlapping with the slit in plan view is formed in the liquid crystal device.

Herewith, even though disclination remains around the area in which the slit is formed during the display operation after the initial transition operation is completed, optical leakage due to the disclination can be prevented. Accordingly, the deterioration of display quality can be restrained to the minimum level.

According to another aspect of the invention, there is provided an electronic apparatus equipped with the liquid crystal device.

The electronic apparatus is equipped with the liquid crystal device for performing initial alignment transition of an OCB mode by a low voltage and within a short time. Accordingly, the electronic apparatus which is superior in display quality can be provided.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described with reference to the accompanying drawings. However, the technical scope of the invention is not limited to the following embodiments. Further, in each of the drawings used in the description below, the contraction scale and the like of each element is appropriately changed for making each element recognizable. Further, the liquid crystal layer side of each member of the liquid crystal device is referred to as the inner side, and the opposite side thereof is referred to as the outer side in the specification. Further, the minimum unit for image display is referred to as a "sub pixel" and the assembly of a plurality of sub pixels equipped with each color filter is referred to as a "pixel". Further, an area in which display using the light introduced from the display surface side of the liquid crystal device is referred to as a "reflective display area" and an area in which display using the light introduced from the back surface side (opposite side to the display surface side) of the liquid crystal device is referred to as a "transmissive display areas"

First Embodiment

First, a liquid crystal device according to a first embodiment of the invention will be described with reference to FIGS. 1A to 4. The liquid crystal device of the embodiment is an active matrix type liquid crystal device in which a TFT element is employed as a pixel switching element.

Figure 1A:
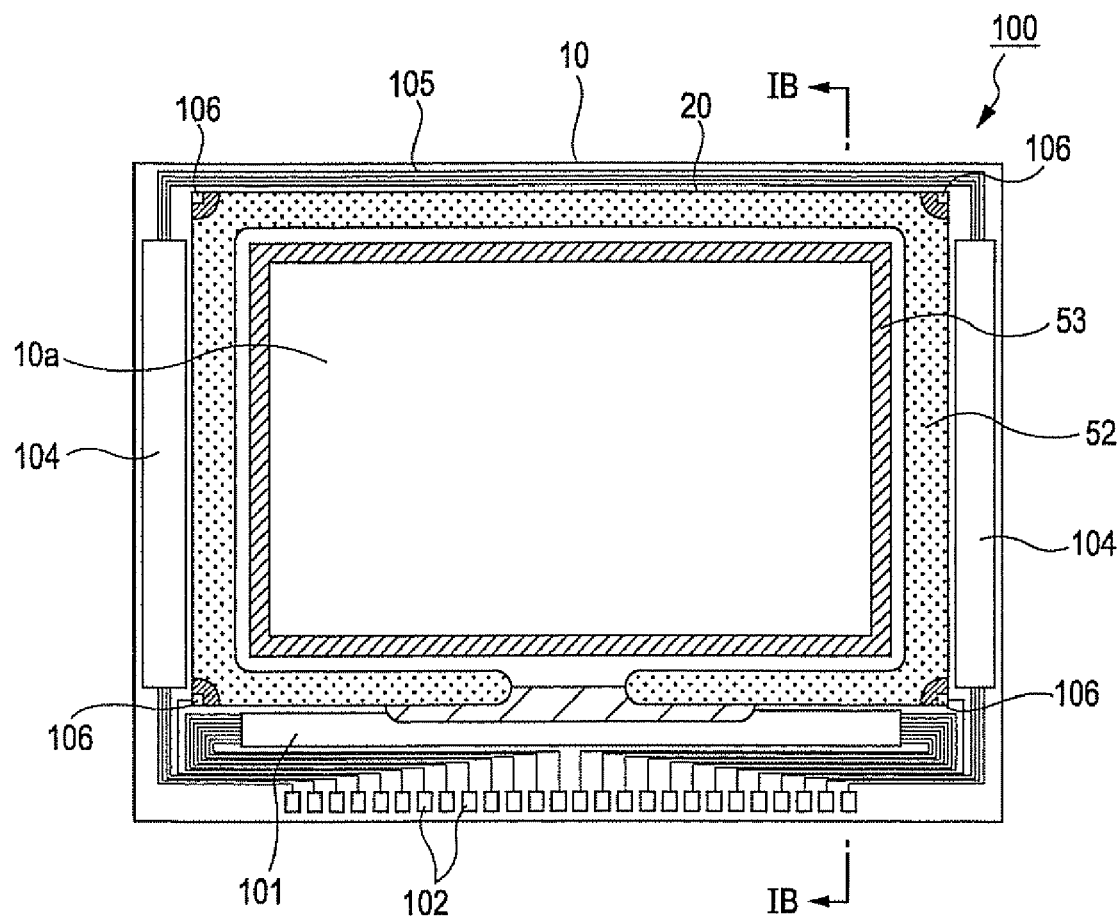
FIGS. 1A and 1B are each a diagram schematically showing a structure of a liquid crystal device according to a first embodiment.
Figure 1B:
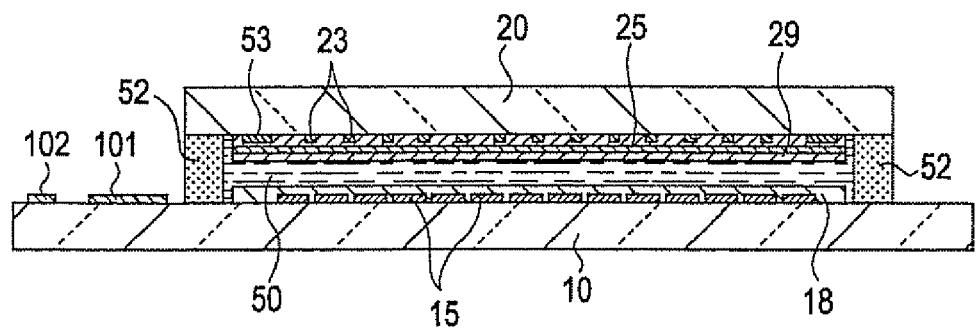

FIG. 1A is a plan view showing a liquid crystal device 100 of the embodiment from the side of an opposing substrate with each element. FIG. 1B is a side cross sectional view taken along the line IB-IB of FIG. 1A.

The liquid crystal device 100 is equipped with an element substrate (one substrate) 10, a counter substrate (the other substrate) 20 oppositely disposed to the element substrate 10, and a liquid crystal layer 50 sandwiched between the element substrate 10 and the counter substrate 20. A liquid crystal material having positive anisotropy of dielectric constant is used for the liquid crystal layer 50.

Further, the element substrate 10 and the counter substrate 20 are stuck together by a sealing material 52 in the liquid crystal device 100 and the liquid crystal layer 50 is enclosed in the area blocked by the sealing material 52. A peripheral delimiter 53 is formed along the inner circumference of the sealing material 52, and the area having a rectangular shape in plan view (the state where the element substrate 10 is viewed from the counter substrate 20 side) surrounded by the peripheral delimiter 53 shall be a pixel display area 10.

Further, the liquid crystal device 100 is equipped with a data line driving circuit 101 and scanning line driving circuits 104 each provided at an area outside the sealing material 52, connecting terminals 102 communicated with the data line driving circuit 101 and the scanning line driving circuits 104, and wirings 105 for connecting the scanning line driving circuits 104.

Figure 2:
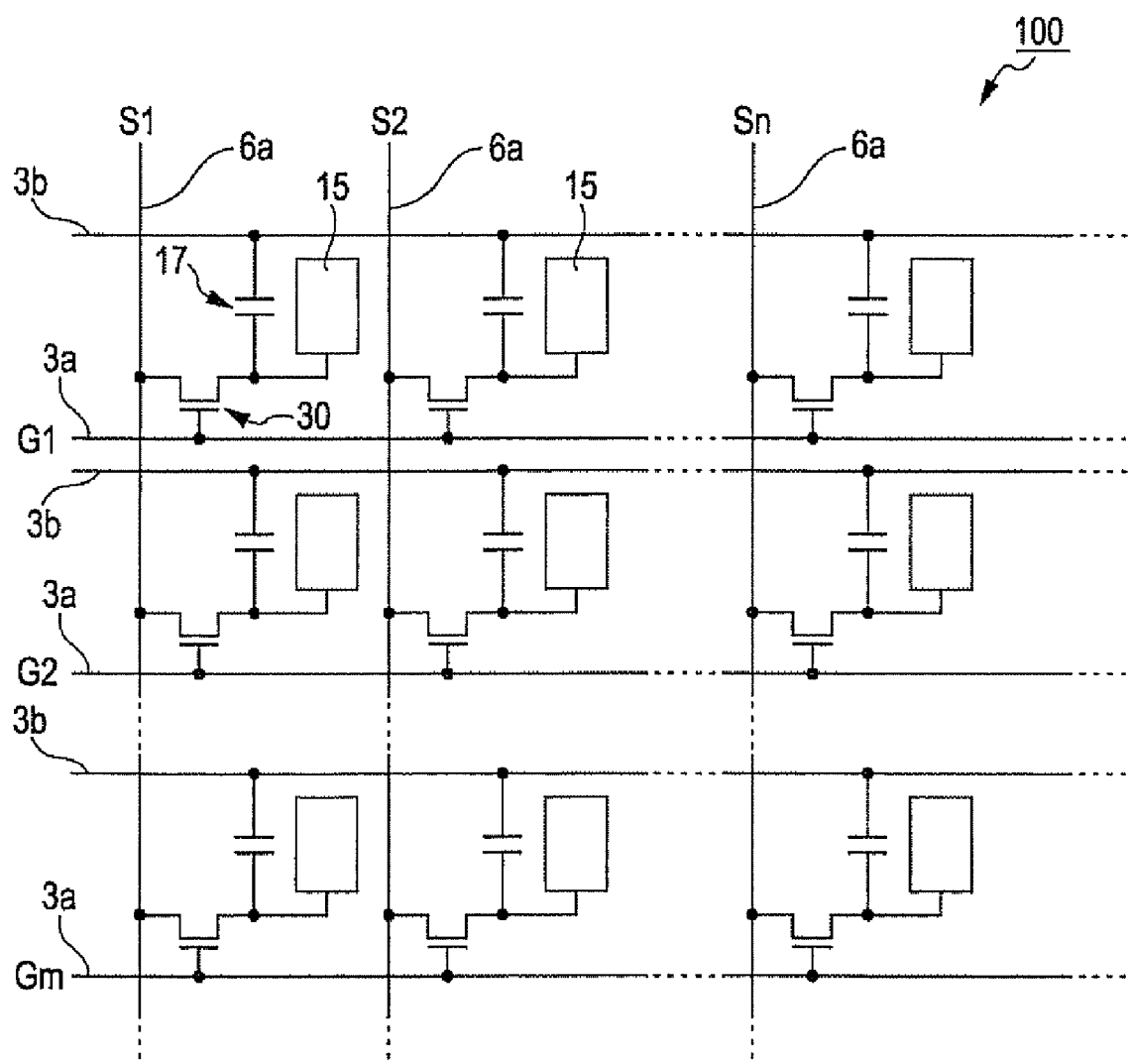
FIG. 2 is a diagram showing an equivalent circuit of the liquid crystal device.

As shown in FIG. 2, a plurality of subs pixel area are arranged in a matrix manner in plan view in the image display area 10a of the liquid crystal device 100. A pixel electrode 15 and a TFT (Thin Film Transistor) 30 for switching and controlling the pixel electrode 15 are provided so as to correspond with the each sub pixel area. Further, a plurality of data lines 6a and scanning lines 3a are also formed in the image display area 10a so as to extend in a grid manner. That is, the sub pixel area corresponds to the area surrounded by the data lines 6a and the scanning lines 3a.

The data line 6a is electrically connected to the source of the TFT 30 and the scanning line 3a is electrically connected to the gate of the TFT 30. The drain of the TFT 30 is electrically connected to the pixel electrode 15. The data lines 6a are electrically connected to the data line driving circuit 101 and supplies image signals S1, S2, . . . Sn supplied from the data line driving circuit 101 to each sub pixel area. The scanning lines 3a are connected to the scanning line driving circuits 104 and supplies scanning signals G1, G2, . . . Gm supplied from the scanning line driving circuits 104 to each sub pixel area. The image signals S1 to Sn supplied to the data lines 6a from the data line driving circuit 101 may be line sequentially supplied in this order or may be supplied to a plurality of adjacent data lines 6a group by group. The scanning line driving circuit 104 sequentially supplies the scanning signals G0 to Gm to the scanning lines 3a in pulses at a predetermined timing.

In the liquid crystal device 100, the image signals Si to Sn supplied from the data lines 6a are written in the pixel electrodes 15 at predetermined timings by making the TFTs 30 which are switching elements to on state for a predetermined period by inputting of the scanning signals G1 to Gm. Then, the image signals S1 to Sn each having a predetermined level written in the liquid crystal via the pixel electrode 15 are stored for a predetermined period between the pixel electrodes 15 and a common electrode described below oppositely disposed thereto through the liquid crystal layer 50.

Herein, in order to prevent leakage of the stored image signals S1 to Sn, a storage capacitor 17 is connected in parallel to the liquid crystal capacity formed between the pixel electrode 15 and the common electrode. The storage capacitor 17 is provided between the drain of the TFT 30 and a capacitor line 3b.

Figure 3:
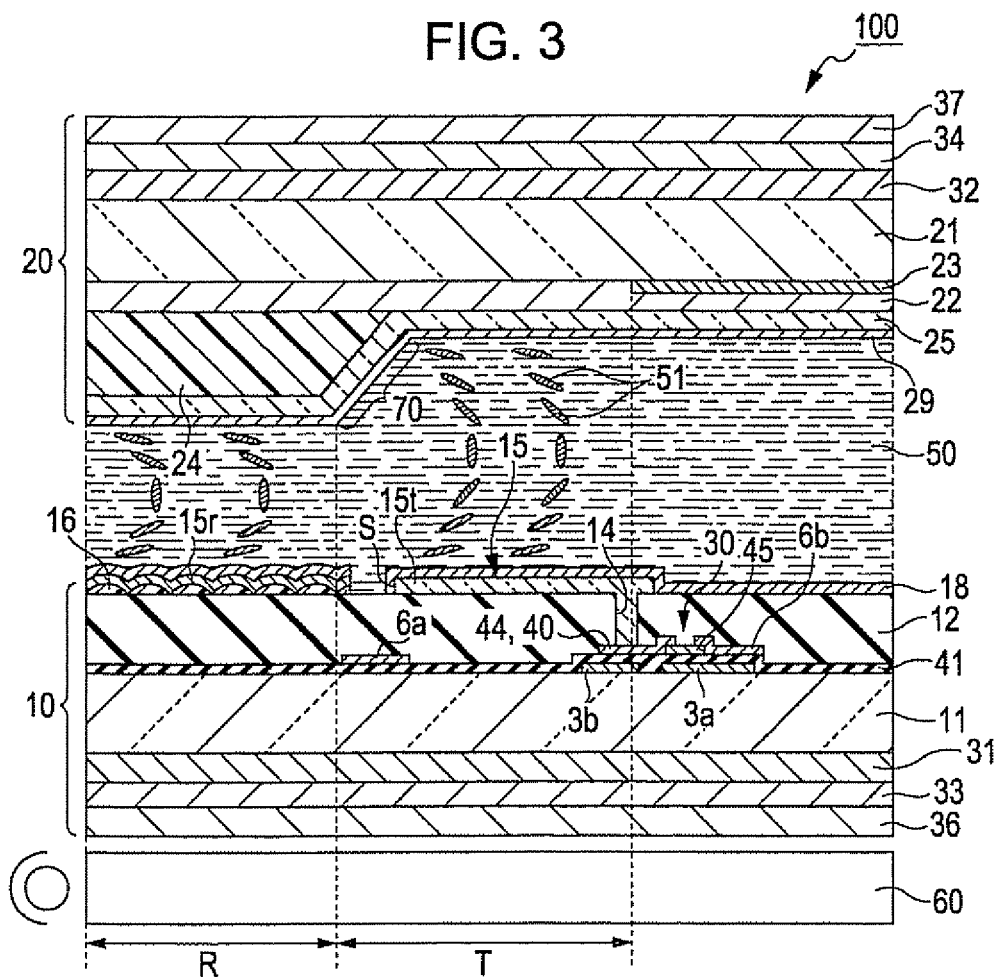
FIG. 3 is a diagram showing a side cross sectional structure of the liquid crystal device.
Figure 4:
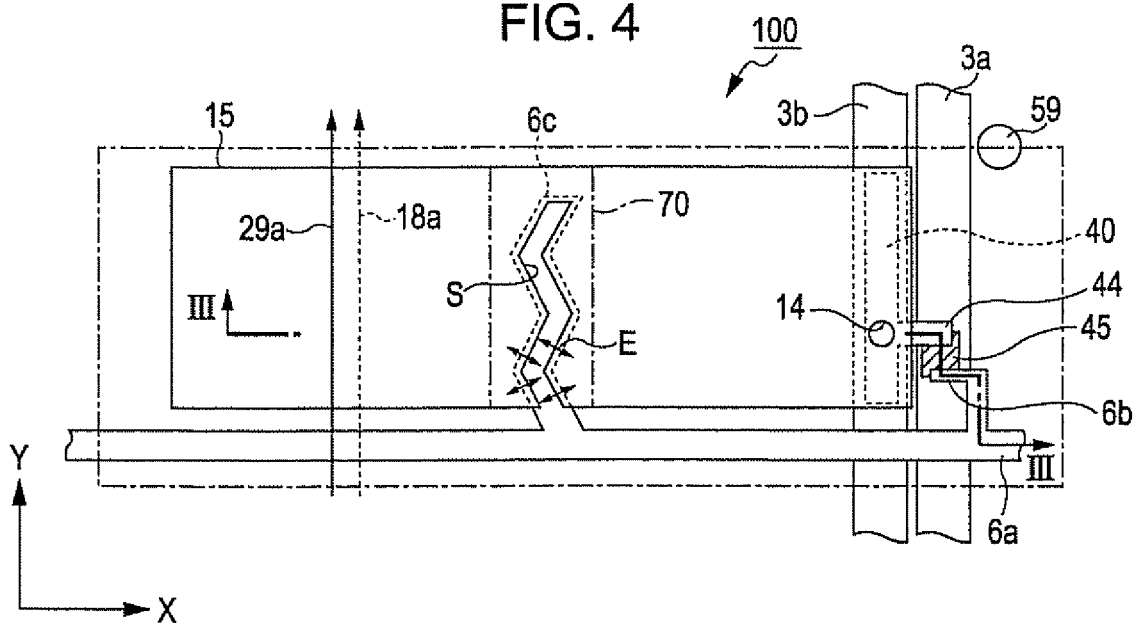
FIG. 4 is a diagram showing a plan structure of a sub pixel constituting one pixel display unit.

FIG. 3 is a side cross sectional view showing the liquid crystal device according to the embodiment taken along the line III-III of FIG. 4. Further, FIG. 4 is a plan view showing a structure of a sub pixel constituting one image display unit of the liquid crystal device 100. In FIG. 4, the longitudinal axis direction of the sub pixel area having approximately rectangular shape in plan view, the long axis direction of the pixel electrode 15, and the extending direction of the source line 6a are set to X direction, and the short axis direction of the sub pixel area, the short side direction of the pixel electrode 15, and the extending direction of the scanning line 3a and the capacitor line 3b are set to Y axis direction.

As shown in FIG. 3, the liquid crystal device according to the embodiment is equipped with the element substrate 10, the counter substrate 20 oppositely disposed to the element substrate 10, the liquid crystal layer 50 sandwiched between the substrates 10, 20, and a liquid crystal layer thickness adjusting layer 50 for performing both reflective display by reflecting the light introduced from the counter substrate 20 side and transmissive display by transmitting the light from the element substrate 10 side, and for making the thickness of the liquid crystal layer 50 in a reflective display area R thinner than the layer thickness of the liquid crystal layer 50 in a transmissive display area T.

Further, the liquid crystal device 100 is equipped with a back light (illumination device) 60 provided at the outer surface side (panel back surface side) of the element substrate 10. As for the back light 60, a known illumination device having a light source, a reflector, a light guide plate, and the like can be used. The back light is for a display light in the transmissive display area T. That is, the liquid crystal device 100 according to the embodiment is a transflective liquid crystal device of so called a multi-gap system.

The liquid crystal layer 50 operated in an OCB mode which will be described below in detail, is sandwiched between the element substrate 10 and the counter substrate 20. Accordingly, in the liquid crystal device 100 according to the embodiment, the liquid crystal molecules are aligned in a bend alignment during the operation to allow high speed response operation, which makes it possible to provide excellent moving image display quality (see FIG. 5). Note that, FIG. 3 specifically shows the alignment state of the liquid crystal molecules 51 aligned in a bend alignment between the substrates 10, 20 and the alignment state is not necessarily matched with the actual alignment state.

A transparent substrate main body 11 formed by glass, quartz, plastic, or the like constitutes a basic part of the element substrate 10, and the scanning line 3a and the capacitor line 3b are formed at the inner surface side (liquid crystal layer 50 side) of the substrate main body 11. An insulating thin film 41 is formed to cover the scanning line 3a and the capacitor line 3b. A semiconductor layer 45 formed by an amorphous silicon film having a rectangular shape in plan view is formed at the position opposing the scanning line 3a through the insulating thin film 41. Further, a source electrode 6b and a drain electrode 44 are formed so as to ride on a part of the semiconductor layer 45. Then, an interlayer insulating film 12 is formed so as to cover the semiconductor layer 45, the source electrode 6b, and the drain electrode 44. A contact hole 14 passing though the interlayer insulating film 12 and reached the drain electrode 44 is formed. The pixel electrode 15 is formed on the interlayer insulating film 12 and the pixel electrode 15 on the interlayer insulating film 12 and the drain electrode 44 (TFT 30) are electrically connected via the contact hole 14.

A resin layer 16 having irregularities on the surface is provided at the inner side of the element substrate 10. The resin layer 16 is formed at one end in the longitudinal direction of a dot area to be an image display unit. A reflective electrode (reflective film) 15r formed by a metal material having a high reflectivity such as Al, Ag or the like is formed on the surface of the resin layer 16. Further, a transparent electrode 15t formed by a transparent electrically conductive material such as ITO is formed at the remaining part in the longitudinal direction of the dot area. The reflective electrode 15r and the transparent electrode 15t are conductively connected to form the pixel electrode 15. Then, the area in which the reflective electrode 15r is formed is the reflective display area R and the area in which the transparent electrode 15t is formed is the transmissive display area T.

An alignment layer 18 formed by polyimide or the like is formed to cover the pixel electrode 15 and the interlayer insulating film 12. The alignment layer 18 is a horizontal alignment layer which aligns the liquid crystal molecules 51 schematically shown in FIG. 3 in approximately parallel to the layer surface. The alignment layer 18 is subjected to rubbing treatment along the short side direction (Y axis direction) of the pixel electrode 15 shown in FIG. 4 (rubbing direction 18a).

A transparent substrate main body 21 formed by glass, quartz, plastic, or the like constitutes a basic part of the other counter substrate 20. A light shielding film 23 for surrounding the circumference of the sub pixel is formed at the inner surface side (liquid crystal 50 side) of the substrate main body 21 and a CF layer 22 equipped with a color filter which transmits different color light for every sub pixel is formed on the light shielding film 23. Note that the CF layer 22 may be formed at the element substrate 10 side.

A common electrode 25 formed by a transparent conductive material such as ITO is formed on the CF layer 22 in approximately the whole surface of the substrate main body 21. An alignment layer 29 formed by polyimide or the like is formed on the surface of the common electrode 25. The alignment layer 29 is also a horizontal alignment layer which aligns the liquid crystal molecules 51 in approximately parallel to the layer surface. The surface of alignment layer 29 is subjected to a rubbing treatment. The alignment layer 29 is subjected to a rubbing treatment in the direction (29a) parallel to the rubbing direction (alignment regulating direction) 18a of the alignment layer 18 at the element substrate 10 side. The liquid crystal molecules 51 are aligned to make symmetry in up and down direction with respect to the center of the liquid crystal layer 50 in the thickness direction.

It is preferable that the color filter 22 is divided by two areas having a different chromaticity in a dot area. To be more specific, a structure can be employed in which a first color material area is provided to correspond to the planer area of the transmissive display area T and a second color material area is provided to correspond to the planar area of the reflective display area R and the chromaticity of the first color material area is larger than the chromaticity of the second color material area. Further, non coloring area may be provided at a part of the reflective display are R. Herewith, it is prevented that the chromaticity of the display light becomes different in the transmissive display area T in which display light is transmitted through the color filter only once and the reflective display area R in which display light is transmitted through the color filter twice. Accordingly, the visual quality of the reflective display and transmissive display can be uniformed to improve display quality.

A liquid crystal layer thickness adjusting layer 24 is formed on the color filter 22 corresponding to the area in which the reflective electrode 15r is formed. The light introduced into the reflective display area R is transmitted through the liquid crystal layer 50 for two times but the light introduced into the transmissive display area T is transmitted through the liquid crystal layer 50 for only one time in a transflective type liquid crystal device, Consequently, when the retardation of the liquid crystal 50 is different in the reflective display area R and the transmissive display area R, different may occur in optical transmittance ratio and uniform image display can not be obtained. Consequently, by providing the liquid crystal layer thickness adjusting layer 24, the thickness of the liquid crystal layer 50 in the reflective display area R (for example, about 2 µm) is set to about the half of the thickness of the liquid crystal layer 50 in the transmissive display area T (for example, about 4 µm) and the retardation of the liquid crystal layer 50 in the reflective display area R and the transmissive display area T are approximately set to the same vale. In this manner, a multi gap structure is provided by the liquid crystal layer thickness adjusting layer 24 and uniform image display can be obtained in the reflective display area R and the transmissive display area T.

A slope 70 of the liquid crystal layer thickness adjusting layer 24 is formed at the border between the reflective display area R and the transmissive display area T. Herewith, the thickness of the liquid crystal layer 50 is continuously changed from the reflective display area R to the transmissive display area T. The inclined angle of the slope 70 is about 10 degrees to 30 degrees. Generally, the alignment state of the liquid crystal molecules is easily disordered at the slope 70 of the liquid crystal layer thickness adjusting layer 24 and display quality is easily deteriorated. Consequently, in the liquid crystal device of the first embodiment, the reflective display is emphasized by disposing the slope 70 in the transmissive display area T.

As a constituent material of the liquid crystal layer thickness adjusting layer 24, it is preferable to employ a material having electric insulating property and photosensitivity such as acrylic resin. By employing a photosensitive material, patterning using phyphotolithography can be realized and the liquid crystal layer thickness adjusting layer 24 can be formed with high dimensional accuracy. The liquid crystal layer thickness adjusting layer 24 may be provided to the element substrate 10 or may be provided to the both of the element substrate 10 and the counter substrate 20.

As shown in FIG. 4, the source line 6a is disposed along the longitudinal direction (X axis direction of FIG. 4) of the pixel electrode 15 having a rectangular shape and the scanning line 3a is disposed along the short side direction (Y axis direction) of the pixel electrode 15. A capacitor line 3b extending in parallel to the scanning line 3a is disposed so as to adjacent to the pixel electrode 15 side of the scanning line 3a. The TFT (switching element) 30 of bottom gate type is formed on the scanning line 3a at the vicinity of the crossing point of the source line 6a and the scanning line 3a.

The TFT 30 is equipped with a semiconductor layer 45 formed by a amorphous silicon film having an island shape, a source electrode 6b and the drain electrode 44 disposed so that parts thereof overlap with the semiconductor layer 15 in plan view. The scanning line 3a functions as the gate electrode of the TFT 30 at the position overlapping with the semiconductor layer 45 in plan view.

The TFT element 30 is electrically connected to the pixel electrode 15 via the contact hole 14 at the position at which the drain electrode 44 is extend at the pixel electrode 15 side. Then, a columnar spacer 59 for regulating the space between the element substrate 10 and the counter substrate 20 is provided at approximately the center of the pixel electrode and a corner of the subs pixel.

The source electrode 6b is connected to the source line 6a at the edge opposite to the semiconductor layer 45. The drain electrode 44 is connected to a capacitor electrode 40 having an approximately rectangular shape in plan view at the edge opposite to the semiconductor layer 45. The capacitor electrode 40 is disposed in a planar area of the capacitor line 3a and constitute the accumulate capacitor 17 (see FIG. 2) whose electrodes are the capacitor electrode 40 and the capacitor line 3b. The drain of the TFT 30 and the pixel electrode 15 are conductively connected by electrically connecting the pixel electrode 15 and the capacitor electrode 40 via a pixel contact hole 14 formed in a planar area of the capacitor electrode 40.

A slit S is formed in the area overlapping in plan view with the slope 70 which is provided between the reflective display area R and the transmissive display area T of the pixel electrode 15. As show in FIG. 47 the slit S is formed at the edge side near the source line 6a, and the source line 6a is formed along the shape of the slit shape in the slit S. The source line 6a is formed along the whole of the slit shape in the embodiment. However, note that the source line 6a may be formed along at least a part of the slit shape.

Specifically, the slit S is formed by a zigzag shape having a plurality of bending sections. Further, the source line 6a has a bifurcated part 6c. The branch part 6c is formed along the shape of the slit S and the width of the branch part 6c is set larger than the width of the slit S. Herewith, the edge of the pixel electrode 15 is disposed on the branch part 6c.

As shown in FIG. 3, polarizers 36, 37 are respectively provided outside the element substrate 10 and the counter substrate 20. The polarizers 36, 37 transmit straight polarized light vibrating in a specific direction. The polarization axis of the polarizer 36 and the polarization axis of the polarizer 37 are set approximately perpendicular to each other and set in the direction crossing the rubbing direction of the alignment layers 18, 29 at approximately 45 degrees.

Further, an optical compensation film can be disposed inside the polarizer 36 and/or the polarizer 37. By disposing the optical compensation film, retardation of the liquid crystal layer can be compensated when the liquid crystal device is squarely or obliquely viewed, and optical leakage can be reduced to increase contrast. As for the optical compensation film, a negative uniaxial medium in which a discotic liquid crystal or the like whose anisotropy of reflective index is negative is aligned in a hybrid manner can be used. Further, a negative uniaxial medium and a positive uniaxial medium can be combined and used. Further, a biaxial medium which satisfies nx>ny>nz in refractive index of each direction may be used.

Figure 5A:
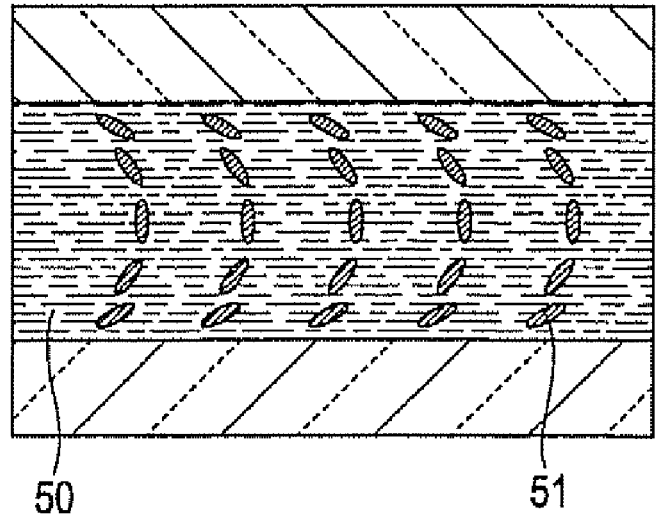
FIGS. 5A and 5B are each a diagram schematically showing an alignment state of liquid crystal molecules.
Figure 5B:
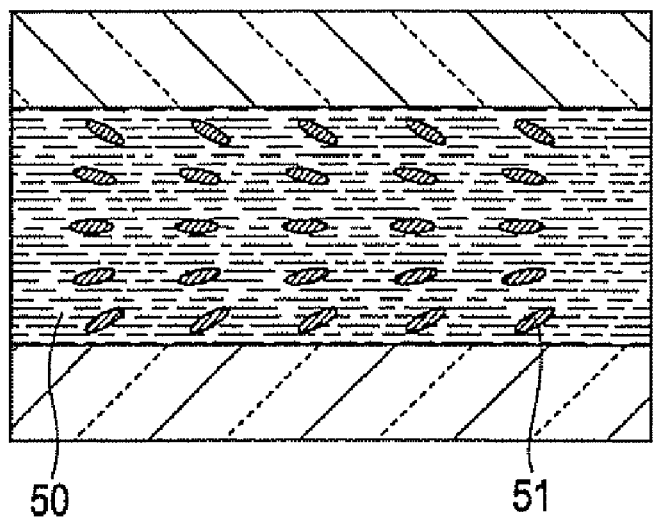

FIGS. 5A and 5B are each an explanatory diagram showing an alignment state of the liquid crystal of the liquid crystal device of an OCB mode. In the liquid crystal device of an OCB mode, the liquid crystal molecules 51 are in an alignment state opened in a splay manner (splay alignment) as shown in FIG. 5B in the initial state (during non operation). On the other hand, the liquid crystal molecules 51 are in an alignment state bent in an arched manner (bend alignment) as shown in FIG. 5A during display operation. Then, the high speed response of display operation can be provided by modulating the transmittance ratio by varying a bend degree of the bend alignment during display operation.

As described above, when the liquid crystal device is operated in an OCB mode, the liquid crystal is in splay alignment when power source is off. Accordingly, so called initial transition operation to cause transition from the initial splay alignment state shown in FIG. 5B to the bend alignment state shown in FIG. 5A by applying a voltage larger than a threshold voltage to the liquid crystal is required when power source is turned on, because the bend alignment state is required during display operation. Herein, when the initial transition is not fully performed, display error may occur or a desired high speed response can not be obtained.

As for the initial transition operation of the liquid crystal layer 50, a method for applying a pulse voltage to only source line 6a may be employed. At this time, an electric field E is applied between the source line 6a and the pixel electrode 15, disclination is generated near the position in which the slit S is formed as shown in FIG. 3, and an initial transition nucleus is formed. Then, alignment transition from the splay alignment to the bend alignment started from the initial transition nucleus is propagated and the initial alignment transition of the liquid crystal layer 50 is performed in the whole sub pixel area.

Further, in the embodiment, the slit S is formed along the extending direction of the scanning line 3a (Y axis direction in FIG. 4) and, on the other hand, the rubbing directions 18a, 29a of the alignment layers 18, 29 are set to the direction parallel to the Y axis direction. That is, as shown in FIG. 4, the slit S is formed so that the main direction of the electric field E (see FIG. 4) applied between the slit S and the source line 6a (branch part 6c) crosses the initial alignment direction (Y axis direction) of the liquid crystal molecules 51. By employing such a structure, the liquid crystal molecules near the slit S are forcibly aligned in the electric field direction by the initial transition operation, as a result, disclination is generated at the border between the liquid crystal area regulated in the Y axis direction by the rubbing and the liquid crystal area aligned in the electric field E direction, and the disclination becomes the initial transition nucleus.

As described above, the slit S has a plurality of bending sections, so that the electric filed can be generated in various directions between the pixel electrode 15 and the branch part 6c of the source line. Accordingly, a transition nucleus can be further surely generated by the bending sections and uniformity and high speed property of the initial transition can be further enhanced.

An edge of the pixel electrode 15 is disposed on the branch part 6c in the liquid crystal device 100 according to the embodiment, so that liquid crystal molecules 51 above the edge of the pixel electrode 15 can be aligned, so that and the initial transition can be generated in a wide range on the pixel electrode 15.

Further, the liquid crystal near the area in which the electric field E is formed becomes a twisted aligned state with respect to the liquid crystal layer 50 therearound when an oblique electric field E is formed between the pixel electrode 15 and the source line 6a in the liquid crystal device 100 according to the embodiment. In the liquid crystal layer operated by an OCB mode, the energy (Gibbs energy) state of twist alignment is positioned between the energy state in the splay alignment and the energy state in the bend alignment shown in FIGS. 5A and 5B, so that the initial transition from the twist alignment to the bend alignment becomes extremely easy.

Further, in the embodiment, as described above, the slit S is formed at the slope 70 of the liquid crystal layer thickness adjusting layer 24 in which the alignment of the liquid crystal molecules 51 is easily disturbed, so that the liquid crystal molecules 51 can be easily aligned by the electric field E generated between the branch part 6c disposed in the slit S and the pixel electrode 15.

As described above, according to the liquid crystal device 100 of the embodiment, by applying a voltage to the source line 6a, the electric field generated between the source line 6a and the pixel electrode 15 can be used for the initial transition operation at the vicinity of the area in which the slit S of the pixel electrode 15 is formed. Further, as the slit S is provided at the slope 70 of the liquid crystal layer adjusting layer 24 in which alignment is easily disturbed as the liquid crystal molecules 51 are obliquely aligned, disclination can be easily generated in the liquid crystal layer 50 by the electric field E. Accordingly, the initial transition can be easily propagated from the disclination, i.e. a transition nucleus, so that the initial alignment transmission in an OCB mode liquid crystal device can be performed at a low voltage and with rapidity.

Second Embodiment

Next, a second embodiment of the liquid crystal device of the invention will be described with reference to the accompanying drawings. The liquid crystal device according to the second embodiment is a transflective liquid crystal device of a TFT active matrix type similar to the liquid crystal device 100 according to the first embodiment, and the characteristic point is that a gate line as a signal line is formed to overlap the slit. Note that the fundamental structure except the characteristic point is the same as that of the liquid crystal device of the abode described embodiment. Accordingly, the same reference numerals are used to denote the similar parts and description thereof is abbreviated or omitted.

Figure 6:
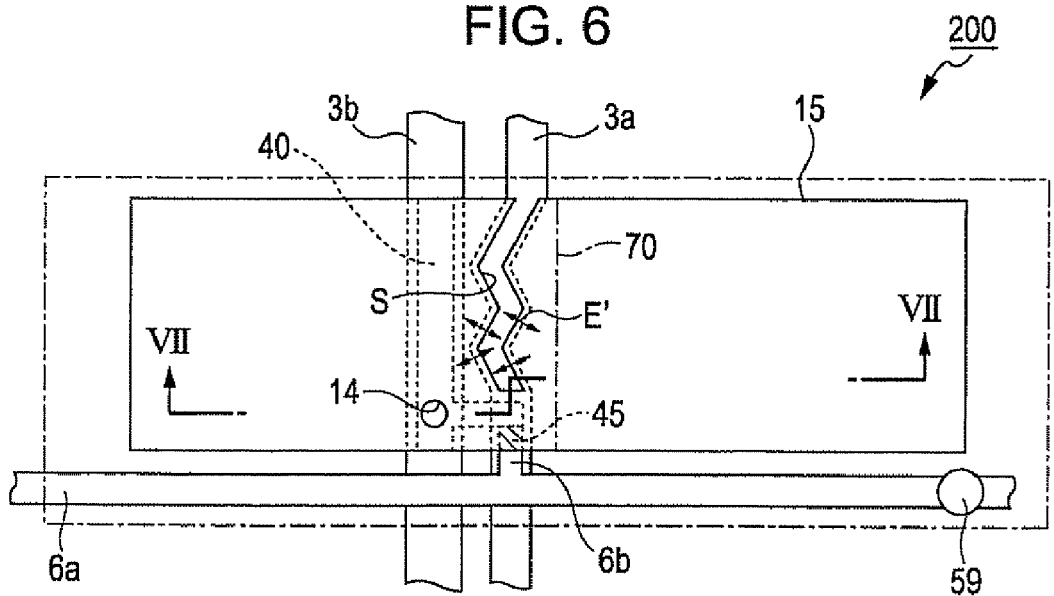
FIG. 6 is a diagram showing a plan structure of a sub pixel of a liquid crystal device according to a second embodiment.
Figure 7:
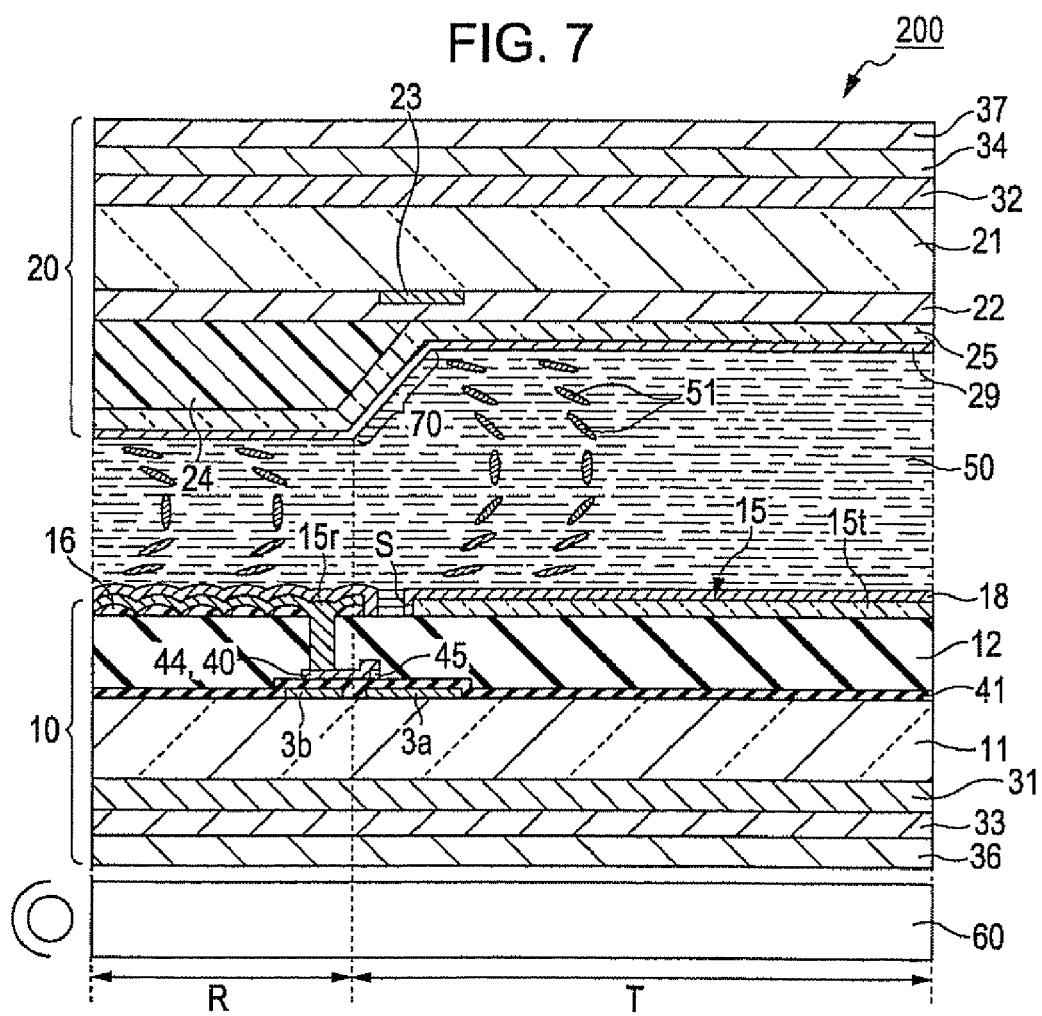
FIG. 7 is a diagram showing a side cross sectional structure of the liquid crystal device according to the second embodiment.

FIG. 6 is a plan view showing a structure of a sub pixel forming one image display unit of a liquid crystal device 200. FIG. 7 is a side cross sectional view taken along the line VII-VII of FIG. 6.

In the embodiment, as shown in FIG. 6, a slit S is formed in an area overlapping with the slope of the liquid crystal thickness adjusting layer in plan view and the scanning line 3a connected to the TFT 30 is formed along the shape of the slit. In the embodiment, the scanning line 3a is formed along the whole of the slit shape. However, note that the scanning line 3a may be formed along at least a part of the slit shape.

Specifically, in the example, the slit S is formed by a flat zigzag shape and has a plurality of bending sections. Further, the scanning line 3a is set so that the width thereof is larger than the width of the slit S in the portion in which the scanning line 3a is formed along the slit shape. Herewith, an edge of the pixel electrode 15 is disposed on the branch part 6c.

The slit S is formed from the edge side of the pixel electrode 15 opposite to the side at which the TFT 30 is provided. Herewith, the TFT 30 is covered by the pixel electrode 15. Generally, it is difficult to generated electric field between with the pixel electrode 15 just above the TFT 30. Accordingly, the whole area in which the slit S is formed is effectively used as an electric field generating portion by forming the slit S from the edge side opposite to the side at which the TFT 30 is provided.

Further, a plurality of bending section is provided similar to the above embodiment. Herewith, electric field can be generated in various directions between the branch part 6c of the gate line and the pixel electrode 15, so that a transition nucleus can be further surely generated and uniformity and high speed property of the initial transition can be further enhanced.

In the liquid device 200 according to the embodiment, the drain electrode 44 and the pixel electrode 15 are conductively connected via the contact hole 14 provided in the reflective electrode 15r. Accordingly, the capacitor line 3b is hidden at the back surface of the reflective electrode 15*r*, so that deterioration of aperture ratio due to the existence of the capacitor line 3*b* can be prevented.

A method for applying a predetermined pulse voltage to the scanning line 3*a* while applying a bias voltage to the source line 6*a* can be used as an initial transition operation in the liquid crystal device 200 according to the embodiment. At this time, an electric field E' is formed between the scanning line 3*a* and the pixel electrode 15, disclination is generated near the position at which the slit S is formed as shown in FIG. 6, and an initial transition nucleus is formed. Then, alignment transition from the splay alignment to the bend alignment started from the initial transition nucleus is propagated and the initial alignment transition of the liquid crystal layer 50 is performed in the whole sub pixel area.

Further, in the embodiment, similar to the above embodiment, the slit S is formed so that the main direction of the electric field E' (see FIG. 6) generated between the slit S and the scanning line 3*a* crosses to the initial alignment direction (Y axis direction) of the liquid crystal molecules 51. Herewith, the liquid crystal molecules near the slit S are forcibly aligned in the electric field direction by the initial transition operation, as a result, disclination is generated at the border between the liquid crystal area regulated in the Y axis direction by the rubbing and the liquid crystal area aligned in the electric field E' direction, and the disclination becomes the initial transition nucleus.

In the liquid crystal device 200 according to the embodiment, as shown in FIG. 7, the light shielding film 23 is formed to overlap with the slope 70 of the liquid crystal thickness adjusting layer 24 in plan view. That is, the area in which the slit S is formed is covered by the light shielding film 23 in plan view. According to the structure, even though disclination remains around the area in which the slit S is formed during display operation after the initial transition operation is finished, optical leakage due to the disclination can be prevented. Accordingly, deterioration of display quality can be restrained to the minimum level.

The voltage applied to the scanning line (gate line) 3*a* is higher than the voltage applied to the other signal line (source line 6*a*) not only during initial alignment transition but also during display operation, so that the electric field E' described above becomes larger as the voltage, so that disclination can be more surely generated.

Further, the slit S is formed at the slope 70 of the liquid crystal layer thickness adjusting layer 24 in which the alignment of the liquid crystal molecules 51 is easily disturbed also in the embodiment, so that the liquid crystal molecules 51 can be easily aligned by the electric field E' generated between the scanning line 3*a*, which overlaps the slit S, and the pixel electrode 15.

Note that, the liquid crystal device of the invention is not limited to the above described embodiments and the one in which various modifications are made to the above each embodiment is also included without departing the spirit of the invention. That is, a concrete material, structure and the like described in each embodiment are only an example, so that modifications can be appropriately made. For example, the shape of the slit and the shape of the signal line (scanning line 3*a*, source line 6*a*) described in the above embodiments are not limited to the above embodiments, and for example, an accordion shape or the like in plan view may be employed. Further, in the above embodiments, the liquid crystal device of an active matrix type employing a thin film transistor (TFT 30) as a switching element is exemplified. However, a liquid crystal device of an active matrix type employing a thin film diode as a switching element may be applied to the invention.

Electronic Apparatus

Figure 8:
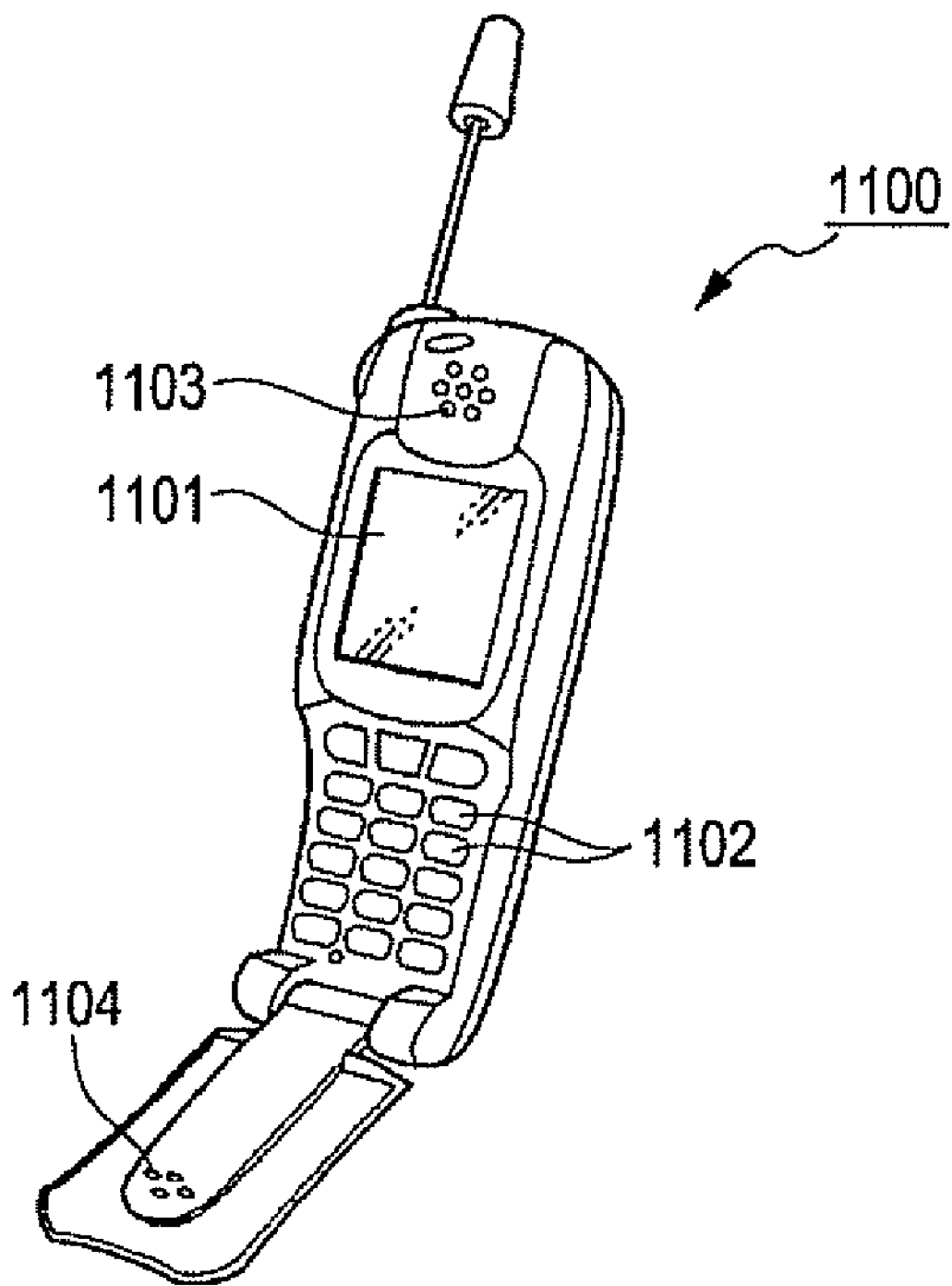
FIG. 8 is a diagram schematically showing a structure of a mobile phone as an embodiment of an electronic apparatus of the invention.

FIG. 8 is a perspective view showing an example of an electronic apparatus according to the invention. A mobile phone 1100 shown in FIG. 8 is equipped with a small display unit 1101 as the liquid crystal device of the embodiments and equipped with a plurality of operation buttons 1102, an earpiece 1103, and a mouthpiece 1104.

The liquid crystal device according to the embodiments can smoothly perform initial transition operation of an OCB mode by a low voltage and within a short time, so that the mobile phone 1100 equipped with a liquid crystal display unit which is superior in display quality can be provided.

The liquid crystal device of the above each embodiment can be preferably used for not only the electronic apparatus described above but also as image display means of an electronic book, a personal computer, a digital still camera, a liquid crystal television, a viewfinder-type or monitor-direct-view-type video tape recorder, a pager, an electronic organizer, a calculator, a word processor, a work station, a videophone, a POS terminal, and an apparatus having a touch panel, or the like. Display quality which is bright and superior in high-contrast can be obtained in any of the electronic apparatuses.

What is claimed is:

1. A liquid crystal device comprising:
a pair of substrates; and
a liquid crystal layer interposed between the substrates,
wherein the liquid crystal device has a plurality of sub-pixel areas, each of the sub-pixel areas having a reflective display area and a transmissive display area, the liquid crystal device being configured to perform display operation after changing an alignment state of liquid crystal molecules in the liquid crystal layer from a splay alignment state into a bend alignment state; and
a liquid crystal layer thickness adjusting layer that makes the thickness of the liquid crystal layer in the reflective display area thinner than the thickness of the liquid crystal layer in the transmissive display area, wherein
the liquid crystal layer thickness adjusting layer is equipped with a slope disposed mostly in the transmissive display area,
a signal line, a switching element electrically connected to the signal line, and a pixel electrode electrically connected to the switching element are provided on one of the substrates among the pair of the substrates,
a slit is formed in the pixel electrode at an area overlapping with the slope in plan view, and
a part of the signal line is overlapped with at least a part of the shape of the slit.

2. The liquid crystal device according to claim 1, wherein the slit includes a bending section.

3. The liquid crystal device according to claim 1, wherein an edge of the pixel electrode is overlapped with the signal line.

4. The liquid crystal device according to claim 1, wherein the signal line is a source line electrically connected to the switching element.

5. The liquid crystal device according to claim 1, wherein the signal line is a scanning line electrically connected to the switching element.

6. The liquid crystal device according to claim 5, wherein the slit is formed at the edge of the pixel electrode opposite to a side at which the switching element is provided.

7. The liquid crystal device according to claim 1, wherein a light shielding film overlapping with the slit in plan view is formed.

8. An electronic apparatus equipped with the liquid crystal device according to claim 1.

9. The liquid crystal device according to claim 1, wherein the signal line substantially corresponds to the shape of the slit and is overlapped with the entire slit.

* * * * *